(12) United States Patent
Ellis

(10) Patent No.: US 6,619,428 B2
(45) Date of Patent: *Sep. 16, 2003

(54) WALK-THROUGH LADDER

(76) Inventor: J. Nigel Ellis, 306 Country Club Dr., Wilmington, DE (US) 19803

( * ) Notice: Subject to any disclaimer, the term of this patent is extended or adjusted under 35 U.S.C. 154(b) by 245 days.

This patent is subject to a terminal disclaimer.

(21) Appl. No.: 09/918,647

(22) Filed: Aug. 1, 2001

(65) Prior Publication Data

US 2003/0098201 A1 May 29, 2003

Related U.S. Application Data

(63) Continuation of application No. 09/629,177, filed on Jul. 31, 2000, now Pat. No. 6,347,685, which is a continuation-in-part of application No. 09/258,205, filed on Feb. 26, 1999, now Pat. No. 6,095,283.
(60) Provisional application No. 60/102,897, filed on Oct. 2, 1998.

(51) Int. Cl.⁷ .............................. E06C 7/18; E06C 5/00
(52) U.S. Cl. ........................ 182/106; 182/82; 182/127
(58) Field of Search ............................ 182/82, 106, 85, 182/93, 99, 113, 127, 194, 206

(56) References Cited

U.S. PATENT DOCUMENTS

| | | | | |
|---|---|---|---|---|
| 2,634,989 A | * | 4/1953 | Skreberg | 182/106 |
| 2,641,785 A | * | 6/1953 | Pitts et al. | 182/86 X |
| 3,710,893 A | * | 1/1973 | Hippach | 182/106 X |
| 4,265,333 A | * | 5/1981 | Rowell et al. | 182/106 X |
| 4,418,792 A | * | 12/1983 | Cerone | 182/106 |
| 4,509,617 A | * | 4/1985 | Lapeyre | 182/106 X |
| 4,848,517 A | * | 7/1989 | Broyles, III | 182/106 X |
| 5,282,339 A | * | 2/1994 | Devlin et al. | 182/106 |
| 5,813,494 A | * | 9/1998 | Ulschmid et al. | 182/127 X |

* cited by examiner

Primary Examiner—Hugh B. Thompson
(74) Attorney, Agent, or Firm—Peter J. Georges; William D. Breneman; Breneman & Georges

(57) ABSTRACT

Structures and apparatuses such as tank cars that have ladders associated therewith are disclosed which have, at the ladder top, two arrays of a plurality of horizontal rungs suitable for a climber using a ladder to horizontally grip by hand. The arrays form an opening through which a climber can leave or access the ladder while gripping the horizontal handgrip rungs of the arrays. The cross-section of the horizontal handgrip rungs is substantially round and should not exceed 2 inches in diameter. The preferred cross-section of the rungs is within the range of from about ¾"–1" in diameter.

16 Claims, 10 Drawing Sheets

FIG. 10
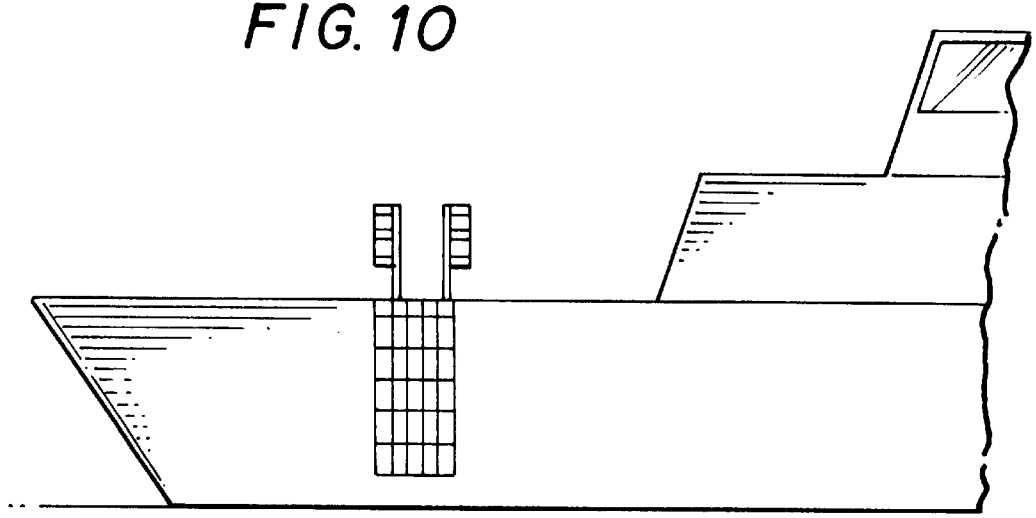
FIG. 11
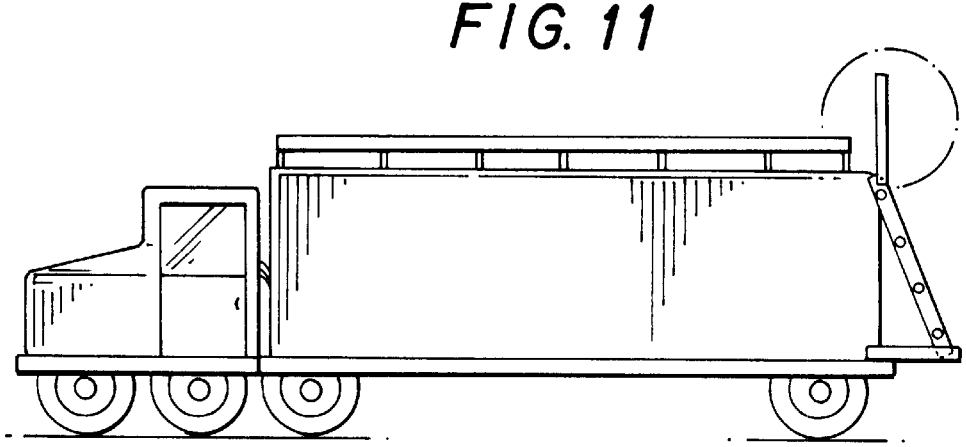
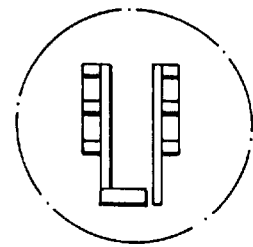
FIG. 12

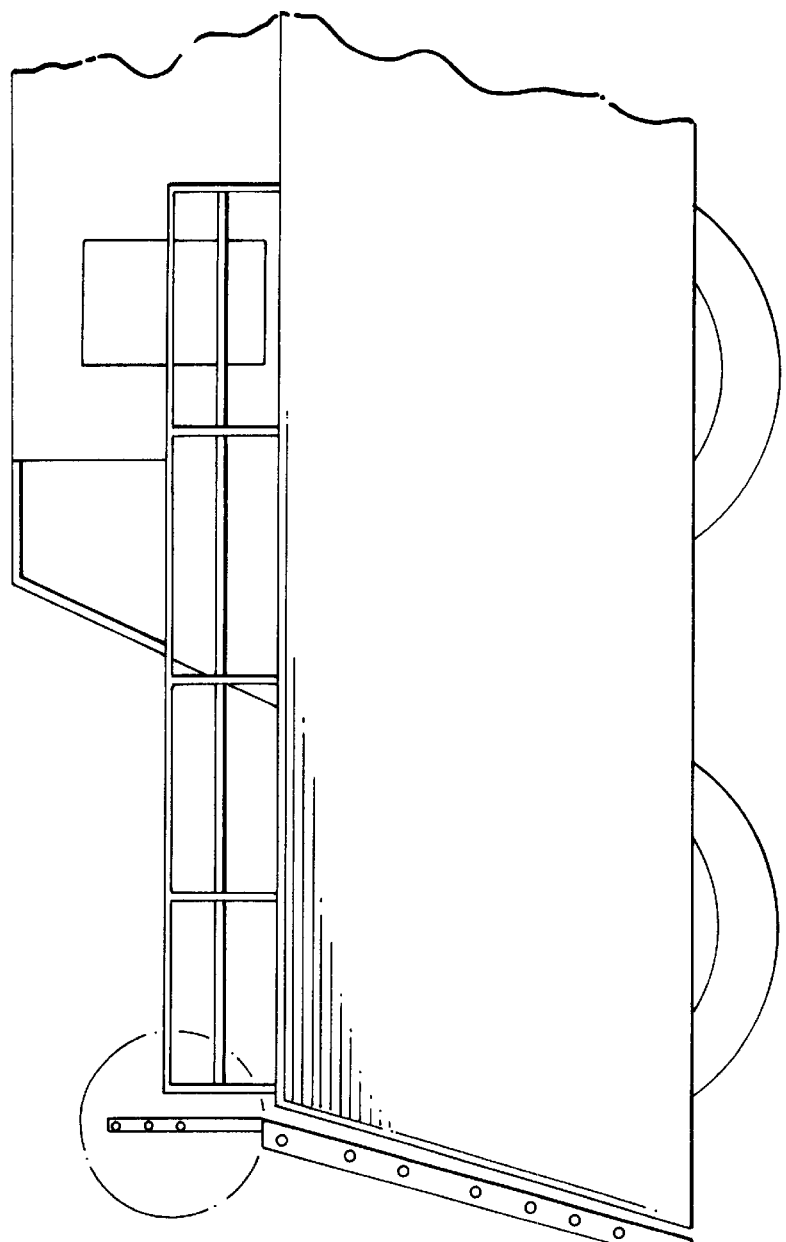
FIG. 20
FIG. 21
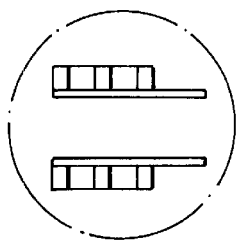

WALK-THROUGH LADDER

CROSS-REFERENCE TO RELATED APPLICATION

This regular utility patent application is a continuation of application Ser. No. 09/629,177 filed Jul. 31, 2000 and allowed Jul. 31, 2001, now U.S. Pat. No. 6,347,685, in turn a continuation-in-part of application Ser. No. 09/258,205 filed Feb. 26, 1999, now U.S. Pat. No. 6,095,283, based on Provisional Patent Application Serial No. 60/102,897 filed on Oct. 2, 1998. The disclosure of U.S. Pat. No. 6,095,283 is incorporated herein by reference thereto.

BACKGROUND OF THE INVENTION

1. Field of the Invention

This invention relates to specific types of handgrip devices, that are adapted for use in combination with ladders for fall protection. The combination of ladder and handgrip arrays comprised of a plurality of parallel handgrip rungs configured in accordance with the present invention forms an opening through which the ladder user can safely pass while horizontally gripping the horizontally disposed handgrip rungs. The characterization "walk-through" includes—depending on the ladder and structure or apparatus to be climbed—all methods of pass-through, including crawling through and the like.

2. Description of the Related Art

A so-called "through" ladder requires a climber getting off at the top to step through, the ladder in order to reach a landing. "Walk-through" fixed ladders are also well known; they typically include a flared section at the top through which the climber walks. See the prior art device in FIGS. 8 and 9 which will be more fully described below.

Fall protection is mandatory through OSHA regulations on fixed ladders over 20 feet tall in general industry and 24 feet tall in construction. The addition of a post of a rail in the center or at the side of the ladder creates an impediment to circumvent so an outside fitting is safer. Ladders could be upgraded by having climbing safety devices installed as extra protection. About half of the ladders in use are less than 20 feet high so such improvements would serve the purpose well if no fall protection exists for these ladders.

One problem with the flared walk-through ladder is that the climber routinely holds a side rail while descending until the moment the flared section is reduced to 16 inches in width. Unless users observe the need to place the hands closer to the body in order to grasp the side rails or rungs on the main body of the ladder, a person will grasp at thin air and will be subject to a fall at that moment if he has transitioned his feet and assumed the location of the handhold by getting a ready to release the other hand.

Moreover, when 2½–3 inch width angle iron is used as the side rail, only a push-pull pinch grip can be made on the side rails and any fall at the walk-through portion of the ladder is likely to be catastrophic in its outcome. In fact, the ability to hold any vertical shape of the side rails sufficiently to regain balance is not possible. The problems with side rail holdings are several.

First, the hand slides down due to the weight of the body. Second, the force of arresting a free fall up to three feet, i.e., the length of the arm, is dynamic. From rope tests, it is known that the maximum force of a moving rope which can be held is 50 pounds and the least is approximately 10 pounds, both far below a person's body weight. These references are found in the *ISFP Newsletter* of October, 1996.

Third, a swing fall into the side of the ladder produces an impact of the body with the ladder since the body's center of gravity has to move eight inches from center to side because a ladder rung is 16 inches long. If a person is standing far over to the side, then a movement of 16 inches will occur with an even higher swing fall collision which further tends to destabilize the hand grip.

Fourth, some ladder side rails are impossible to encircle with the hand, e.g., three-inch angle irons or two-inch flange I-beams. Because these shapes cannot be encircled with the hand for a good grip, only a pinch grip can be used and no fall arrest is remotely possible. With two-inch or 2½ inch widths, grips are possible but, due to the factors described above, the grip cannot become an effective grasp under foreseeable methods of climbing on these ladders and a catastrophe must necessarily follow, if the climber falls.

Fifth, the ground or surface below a fixed ladder is almost always unyielding, thus providing the maximum possible deceleration upon impact and therefore the greatest injury to a falling worker.

Sixth, ladders constitute the primary cause of injurious occupational falls based on current OSHA statistics. Since these statistics include portable ladders as well as fixed ladders, it is evident that a climber, who loses his balance on a ladder, needs all the help possible to maintain a grasp that can be reasonably effective if a foot were to slip at the most vulnerable transition points on the ladder.

All climbers eventually misstep no matter how well they are trained. Usually, the climber is preoccupied about achieving the purpose for which the ladder is climbed, not the actual climbing of the ladder. Therefore, exposure to fall hazards cannot be expected to be controlled effectively solely by training workers to climb ladders with the utmost attention to human factors and back-up safety features.

Typical of walk-through ladders in the prior art is the fixed ladder illustrated in FIGS. 8 and 9. A lower section of a walk-through ladder L is shown below a surface A which schematically represents a level to which a climber C is ascending from a lower surface G. The ladder L includes side rails 1 with a plurality of round foot rungs 2. By way of example, each rung 2 can be 16 inches long at a minimum and ¾ to one inch in diameter. Each side rail 1 can be 2½ inches wide by ⅜ inch to ½ inch in thickness or any size or shape which provides a power grip with materials, such as carbon steel or aluminum, being selected appropriately for the ladder length, usage and environment.

As best shown in FIG. 9, the ladder L at its top above the surface A flares outwardly to form a walk-through section W. The architecture of the walk-through section W may vary depending upon requirements. However, the walk-through section W has parallel vertical side rails 21 and 22 forming an opening O generally, in order to meet code requirements, spaced apart at a distance one from the other about 24 to 30 inches.

As it is also seen in FIG. 9, the walk-through opening O is minimally 3½ feet in height. In this case, if the climber C is about 5'8" tall, the opening O may be about four feet high.

In FIG. 9, the climber C ascends the ladder L normally. As the climber C negotiates his way into and through the opening O, as indicated by arrows R, onto the surface A, the climber's feet may slip. The vertical side rails 21 and 22 of FIG. 8, regardless of shape or configuration, cannot be grasped without great risk of the climber's grip sliding and/or opening up, depending upon the nature of the slip. Furthermore, a free fall can develop from zero to twice the climber's arm length, resulting in an impact on any grip that the climber C may have. In addition, a swing to one side of the ladder L may result in an impact against the side rails 1 of the ladder L. Consequently, the climber's grip cannot be maintained and a hard fall to the surface G below usually occurs, resulting in serious injury or death.

SUMMARY OF THE INVENTION

In the disclosure of U.S. Pat. No. 6,095,283, the teaching of which is incorporated herein by reference thereto, applicant describes an invention relating to a modification of walk-through ladders, namely, providing a second plurality of horizontal grasping rungs associated with the walk-through section which ordinarily does not have any such rungs. These extra rungs are provided for the climber to maintain a continuum of hand grips on the ladder. Such additional rungs are situated above the highest ladder rung. These higher horizontal grasping rungs are easier for the climber to grab and hold than the vertical side rails during passage up into and down from the walk-through section of the ladder, if a foot of the climber slips during such mounting and dismounting of the ladder.

What applicant has found is that the grasping rung system that can be used to advantage in the systems specifically exemplified in U.S. Pat. No. 6,095,283 also have application in combination with ladders found on tank cars, off-road equipment, railcars, marine applications, such as where rope ladders are used for embarkation and debarkation, manholes, ladders, and platforms. The addition of the horizontal grab bars in accordance with the present invention in effect creates a "through ladder" where the climber passes through an opening between two grab bar devices allowing the horizontal grasps/grips to be horizontally grasped/gripped during departure from a ladder top onto a wide array of apparatuses.

Thus, herein invention comprises a ladder having a top end and comprised of a first plurality of rungs defining a first plane. The first plurality of rungs has a top rung having a first end and a second end at the top end of the ladder rungs. The herein invention further comprises a walk-through section at or proximate the top end of the ladder comprising:

(a) a second plurality of parallel handgrip rungs defining a second plane and having top and bottom handgrip rungs;
(b) a third plurality of parallel handgrip rungs defining a third plane and having top and bottom handgrip rungs; said second plane corresponding substantially to said third plane.

The bottom handgrip rung of said second plurality of parallel handgrip rungs is situated proximate the first end of the top rung of said first plurality of rungs at the top end of the ladder and the second plurality of parallel handgrip rungs forms one side of the walk-through section. The bottom handgrip rung of the third plurality of parallel handgrip rungs is situated proximate the second end of the top rung of said first plurality of rungs at the top end of the ladder and the third plurality of parallel handgrip rungs forms the other side of said walk-through section the second and third planes typically are substantially parallel to the first plane; however, as shown schematically in FIG. 20 and FIG. 11, where the ladder is oriented at an angle on the apparatus to be climbed the plane in which the second and third plurality of rungs are situation need not be substantially parallel to the first plane. The walk-through section may be permanently or movably attached to the ladder or structure or apparatus to be climbed.

Thus, where as shown schematically in FIGS. 11 and 20 the ladder is not oriented substantially normal to the surface to which the ladder is affixed; that is, where the climber ascends to a working surface at the top end of the ladder at an angle, the plane of the walkthrough section in which second and third handgrips are attached need not substantially correspond to the plane in which the first plurality of rungs of the ladder are situated.

Indeed, it is preferred that the walk-through section at or proximate the top end of the ladder be oriented substantially normal to the surface to which the climber is ascending.

BRIEF DESCRIPTION OF THE DRAWINGS

FIG. 10 is a front side elevational view of an embodiment of the present invention.

FIG. 11 is a side elevational view of an embodiment of the present invention.

FIG. 12 is a front side view of the top end of the ladder of the embodiment of the invention of FIG. 11.

FIG. 20 is a side elevational view of an embodiment of the present invention.

FIG. 21 is a front elevational view of the top of the ladder of the embodiment of the invention of FIG. 20.

DETAILED DESCRIPTION OF THE PREFERRED EMBODIMENTS

Figure 1:
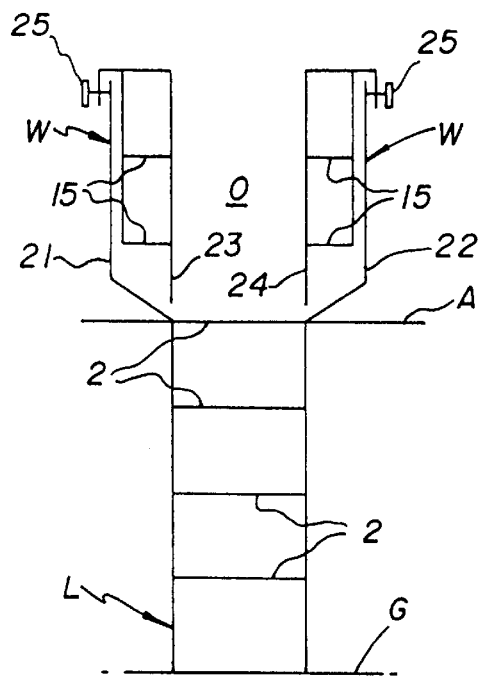
FIG. 1 is a front elevational view of an actual walk-through ladder in accordance with the invention.

As shown in FIG. 1, a second plurality of parallel, horizontal grasping rungs 15 are provided in association with the opening O in the walk-through section W of the fixed ladder L, thus allowing a climber C to grab one of the rungs 15 in the same fashion as the grasp enabled by the first plurality of rungs 2 in the lower climbing section of the ladder L.

Figure 3:
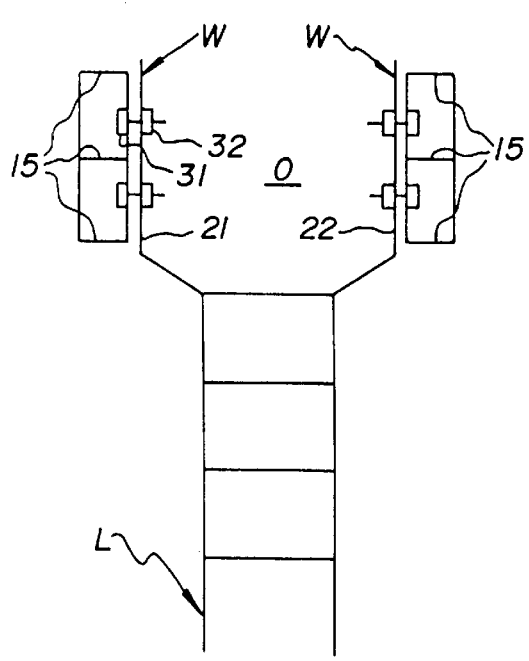
FIG. 3 is a front elevational view of an actual walk-through ladder in accordance with the invention.

As seen in FIG. 3, the rungs 15 may be placed outside of the side rails 21 and 22 of the walk-through section W. Thus, the horizontal grasping rungs 15 may be in the same plane as the opening O but affixed to the side rails 21 and 22 and extending outwardly therefrom rather than into the opening O of the walk-through section W.

As seen in FIG. 1, the present invention is applicable to a job-made ladder L by bolting the rungs 15 at one end to vertically oriented uprights 23 and 24 which extend above the surface A and are aligned parallel to the side rails 21 and 22. Rungs 15 can be either built into new ladders at the time of fabrication or retrofitted to existing ladders.

The purpose of the improvement of the present invention is to provide rung-like grab-bars with spacing similar to the ladder rungs 2 which are further down in the lower section of the ladder L. Thus, the climber C who has the task of climbing up or down the ladder L can do so with greater security by holding onto the horizontal grasping rungs 15 rather than onto the vertical uprights 23 and 24 or the side rails 21 and 22 which cannot be grasped effectively for even short time periods if the climber's feet slip during mounting or dismounting from the walkthrough section W. Dismounting is typically to a landing onto a roof, mezzanine, platform, parapet or other surface A that may be flat or sloped.

The results of a lost grip on the side rails 21 and 22 at the top of the ladder L can be catastrophic with long falls to the ground G or to a lower platform, thus resulting in serious injury or death in many cases each year. This kind of accident can occur even if there is a protective ladder cage (not shown) or if the climber's protection cable (not shown) has been disconnected.

It is preferable that the horizontal grasping rungs 15 associated with the walk-through section W be long enough for the climber's hand, either bare or gloved, to hold preferably 4 to 5 inches and up to 6 inches of the rung 15. Also, a diameter of about 1.5 inches is preferred for the rungs 15. Alternatively, rungs 15 of 0.75 inch diameter or other sizes may be welded or bolted for uniformity with the other rungs 2 to meet codes that require this uniformity over ergonomics.

Ordinarily after a slip, the hand of the climber C cannot hold the vertical side rail 21 or 22 long enough to regain his balance. Thus, a power grip is now required in the 1992 ANSI A14.3 Code Section. Such a power grip cannot be achieved with the prior art ladder which use side rail 2 of flat material with dimension of either ⅜"×2" or ⅜"×2½".

The preferred material may be galvanized steel, stainless steel, aluminum, fiberglass polymer, or any other sturdy substance capable of holding the human body when the material is bolted onto the ladder L. Improved fastening devices can be used to permit a mechanical attachment without the need to drill holes through the ladder L to attach metal bolts thereto. Instead, a single coupling 25, shown schematically in the first embodiment in FIG. 1, could be used for easy fitting of the rungs 15 on each side of the opening O to the side rails 21 and 22 of the walk-through section W.

The assembly including the walk-through section W with the horizontal grasping rungs 15 can be bolted together or welded with seamless joints in such a way that the welds will not break under a normal load or through corrosion or by any other reasonably destructive means.

Figure 2:
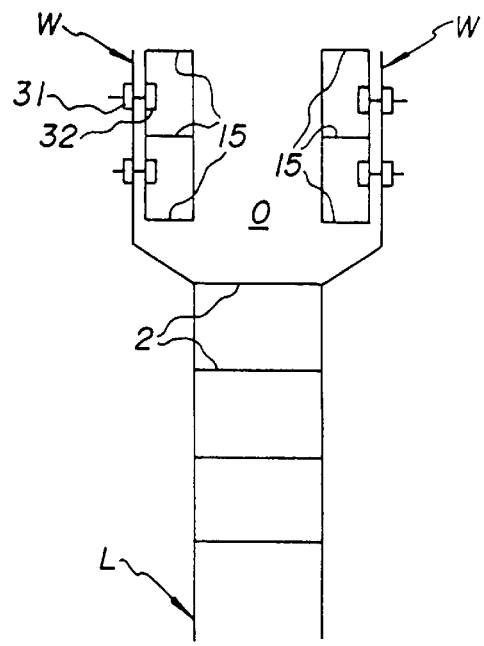
FIG. 2 is a front elevational view of an actual walk-through ladder in accordance with the invention.

The embodiment illustrated in FIG. 2 recognizes that the codes generally call for the flared walk-through section W at the top of the fixed ladder L to broaden outwardly from the rungs 2, which have a 16-inch minimum clear width, to the opening O, which has a clear width of 24 to 30 inches. The additional rungs 15 for climbing protection on the ladder L are accommodated in the opening O which is essentially a higher clear space up to 36 inches in width. However, as one skilled in the ladder art will readily appreciate, the opening O may be decreased in width for safety if it is so desired. In the structures and apparatuses illustrated in FIGS. 5, 6, 7 and 10–19 the opening formed by the handgrip arrays is dependent on the structure or apparatus being climbed as well as ladder size and placement.

Because of the capability of the climber C to span 36 inches which is the maximum allowed by the 1992 A14.3 Code Section without loss of gripping power, the present invention is valuable for increasing safety. If an authority determines that the flaring of the walk-through section W is unnecessary for safety and permits the present invention to be placed inside the flared walk-through section W, thereby narrowing the opening O, the improvement can be of great help to the climber C without sacrificing his ability to dismount properly, even if necessary to do edgewise, because of the increased hand grasping power allowed by the invention. Thus, the climber C can remount the ladder L for descent more easily and safely since the spacing and location of the rungs 2 and 15 are uniform for the entire length of the ladder L and the walkthrough section W in FIG. 2.

The width of a climber's hips ranges from 11.1 to 16.4 inches across the front and a climber's buttocks range from 7.6 to 14.0 inches from front to back according to U.S. Army Mil-Std. 1472C (1980). Tools on the climber's body can add to these dimensions, so fitting in sideways helps minimize the climber's contact with the vertical uprights 23 and 24 in FIG. 1.

Figure 4:
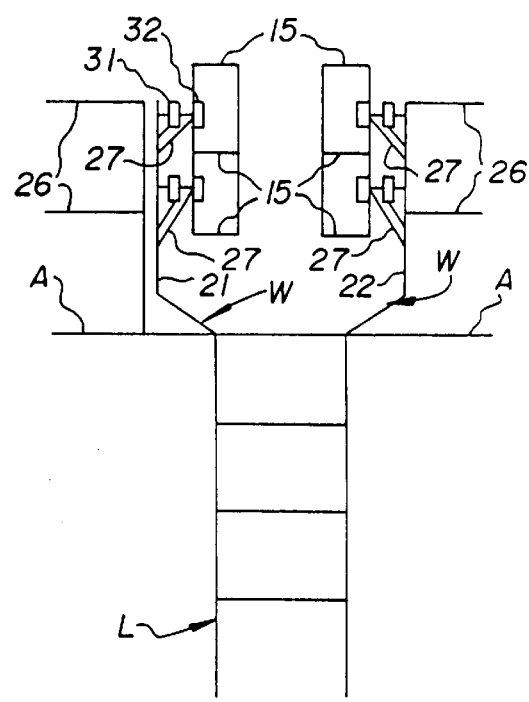
FIG. 4 is a front elevational view of an actual walk-through ladder in accordance with the invention.
Figure 6:
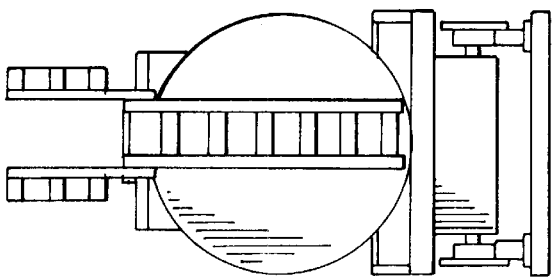
FIG. 6 is a side elevational view of an embodiment of the present invention.
Figure 5:
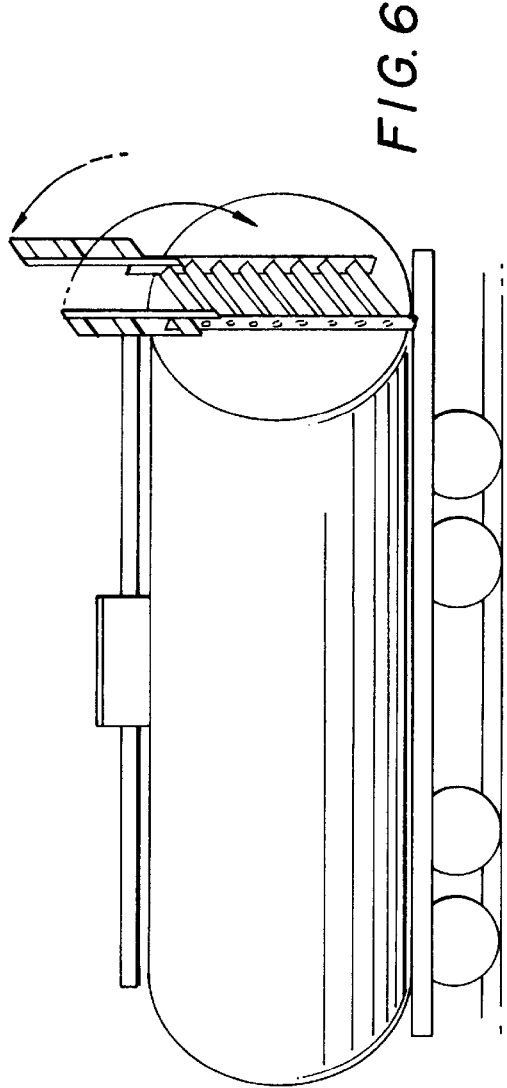
FIG. 5 is an alternative further design of the present invention.
Figure 7:
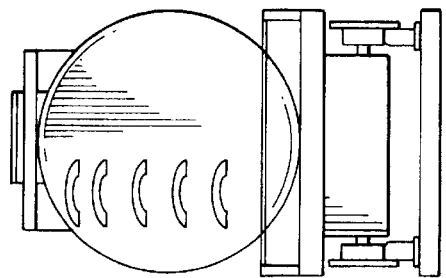
FIG. 7 is a rear elevational view of an embodiment of the present invention.
Figure 8:
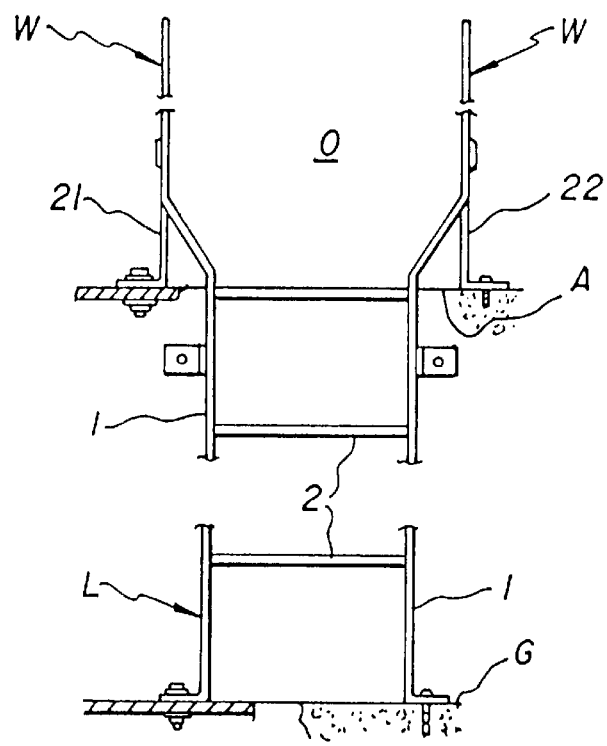
FIG. 8 is a schematic perspective view of an embodiment of the present invention.
Figure 9:
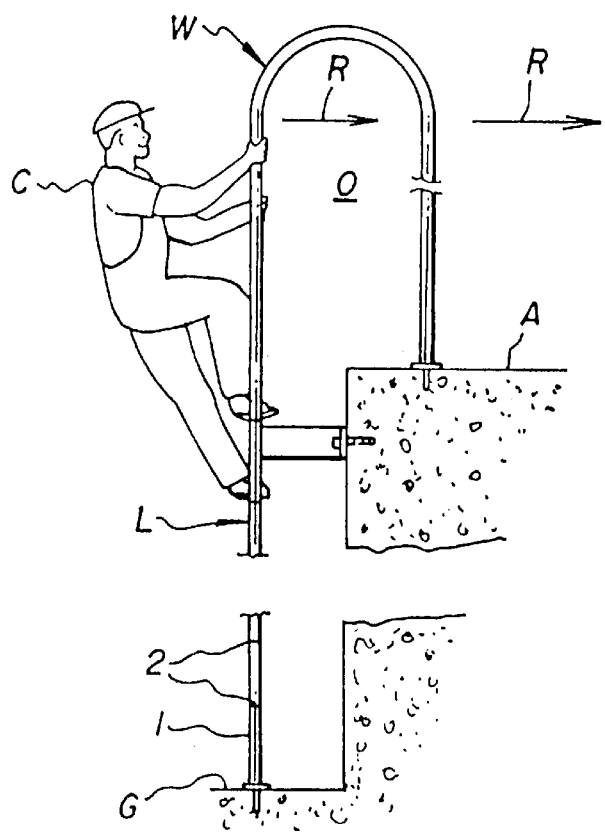
FIG. 9 is a schematic perspective view of an embodiment of the present invention.
Figure 14:
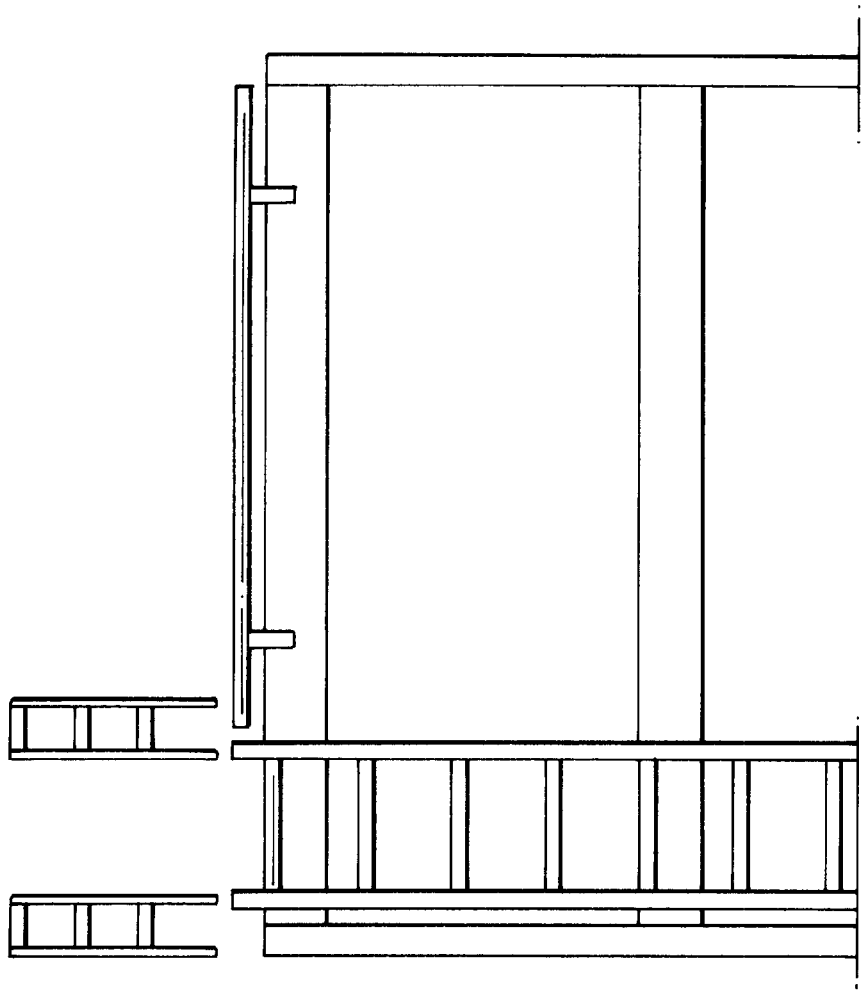
FIG. 14 is a front elevational view of the bunk bed embodiment of FIG. 13 of the present invention.
Figure 13:
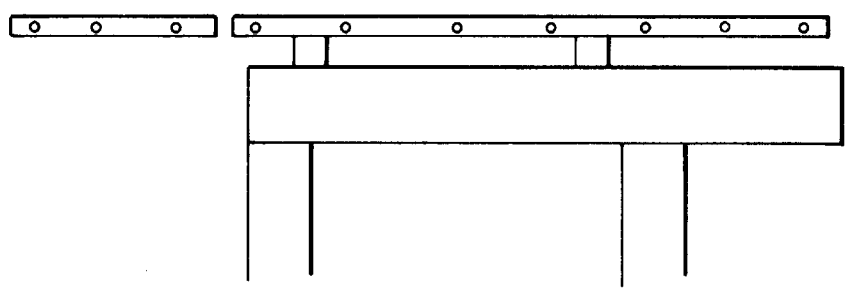
FIG. 13 is a side elevational view of a bunk bed embodiment of the present invention.
Figure 16:
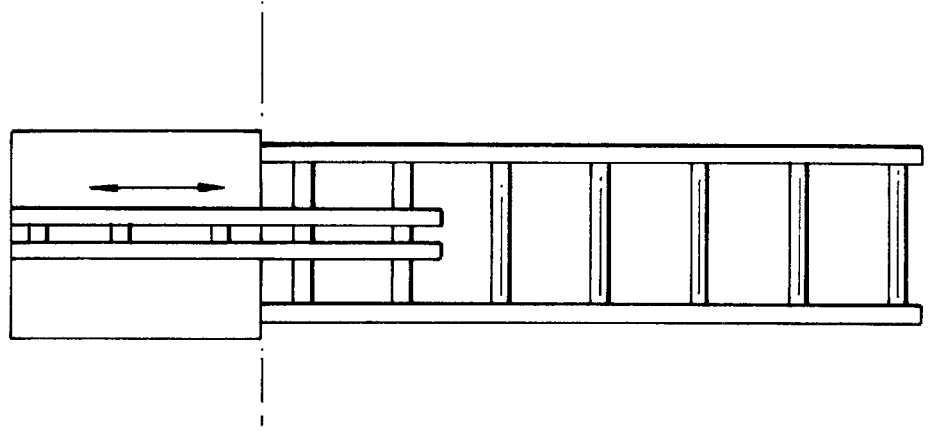
FIG. 16 is a front elevational view of the retractable single pole embodiment of FIG. 15 of the present invention.
Figure 15:
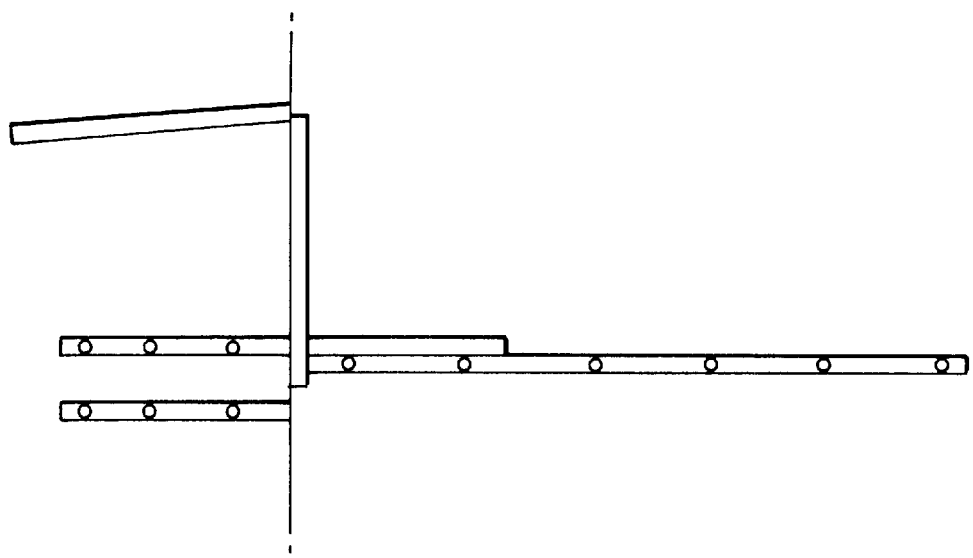
FIG. 15 is a side elevational view of a single grab bar embodiment of the present invention and a side elevational view of a retractable single pole embodiment.
Figure 18:
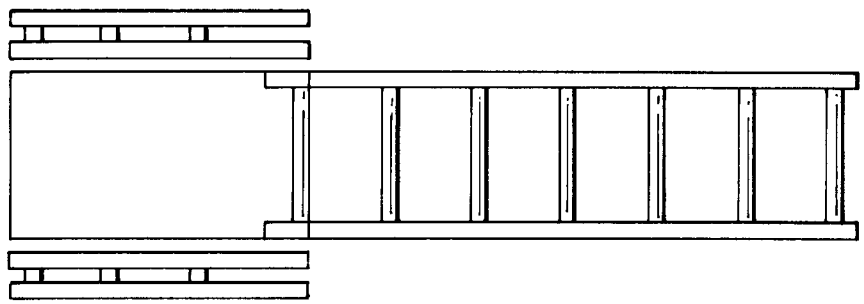
FIG. 18 is a front elevational view of the double grab bar embodiment of FIG. 17 of the present invention.
Figure 17:
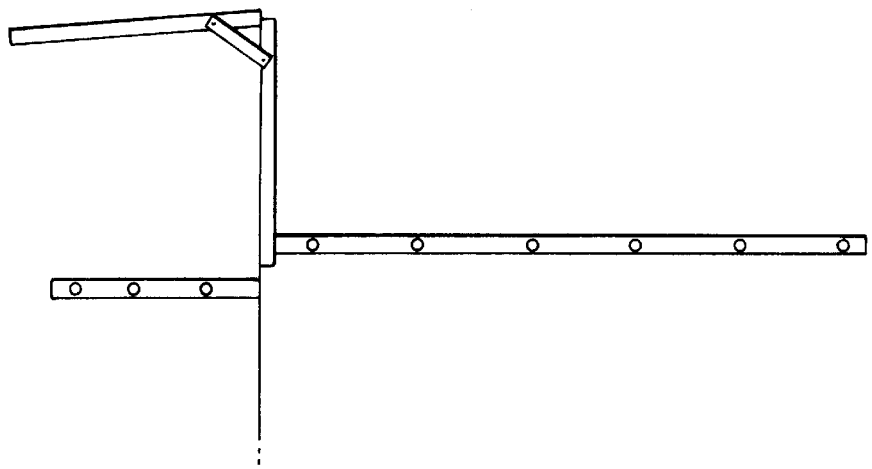
FIG. 17 is a side elevational view of a double grab bar embodiment of the present invention.
Figure 19:
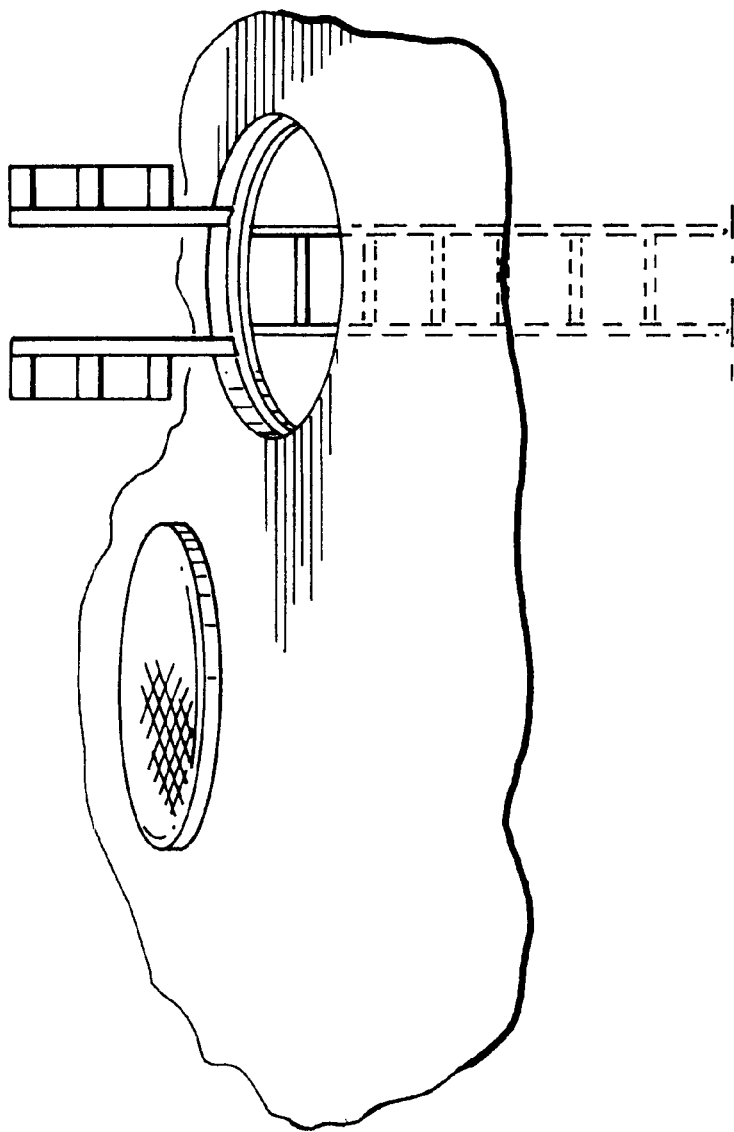
FIG. 19 is a perspective elevational view of a removable grab bar embodiment of the present invention.
Figure 22:
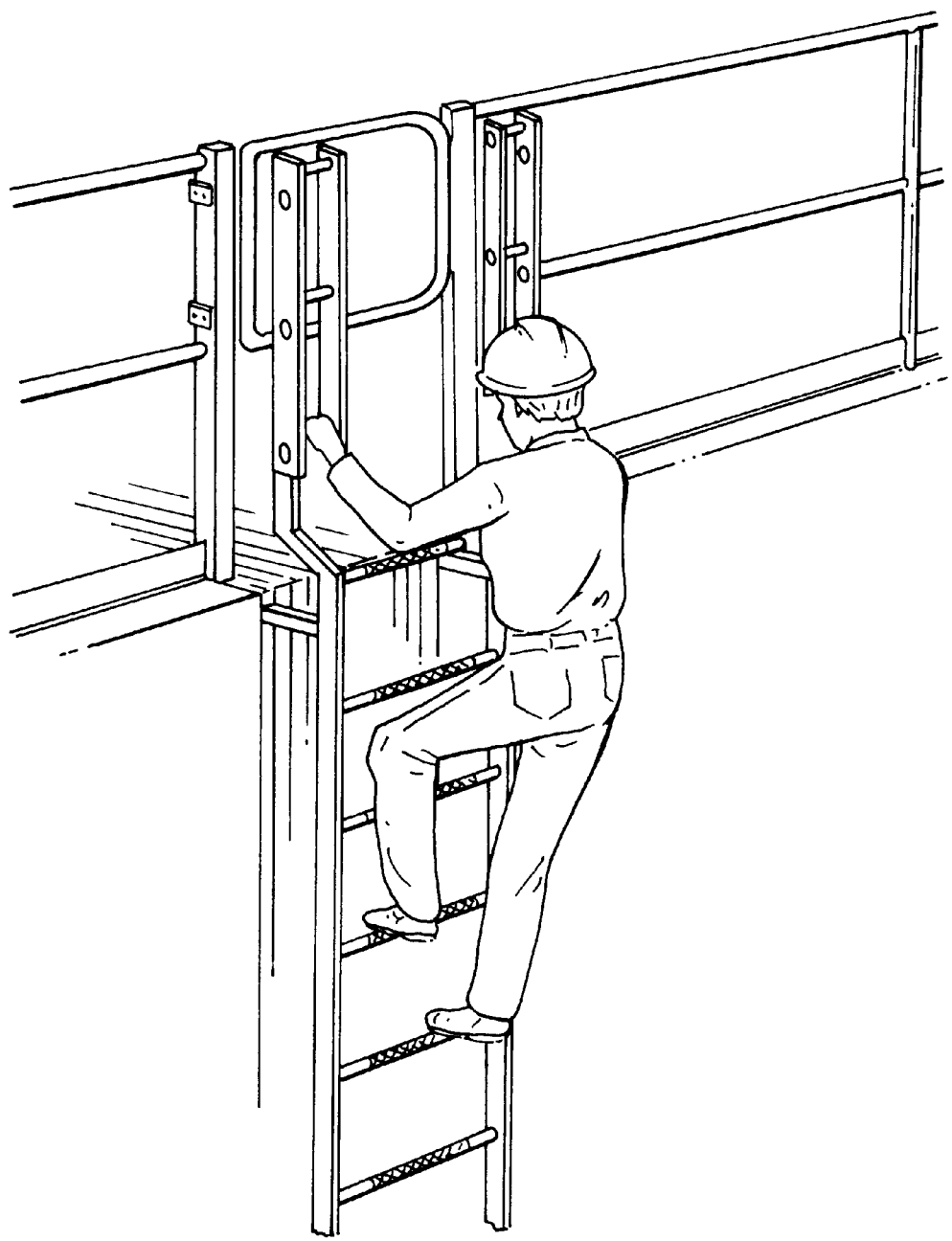
FIG. 22 is a schematic perspective view of an embodiment of the present invention.

If there are railings 26 as seen in FIG. 4, along the side rails 21 and 22, a fitting 27 may be added to allow the plurality of rungs 15 to be mounted to the side rails 21 and 22 inside the walkthrough section W. This fourth embodiment helps the climber C to pull himself manually onto the surface A. Conversely for descent, the closer accessibility of the grasping rungs 15 will be helpful for maintaining confidence of gripping power as the climber C turns around to face the ladder L for descent.

This application is specifically directed to other uses for the horizontal grasping rungs 15 as grab bars which are contemplated for any location where a comfortable handhold is needed to support balance, e.g., on machinery, cranes, platforms, and the like. Such contemplated uses are exemplified in part by reference to FIGS. 5, 6, 7 and 10 to 22, inclusive. The combination of rung arrays affixed either temporarily or permanently to structures or apparatuses that are climbed using ladders allows the user to obtain the advantage of a "walk-through" opening created by the parallel handgrip arrays which, in turn, provide for horizontal handgripping by the climber as the opening is traversed. The rung arrays may alternatively be affixed to the ladders that are used to climb on or over the involved structures or apparatuses.

It should be apparent to persons of ordinary skill in the ladder art that numerous variations of the preferred embodiments described hereinbefore may be utilized and that, while this invention has been described fully and completely with special emphasis upon preferred embodiments, it should be understood that, within the scope of the appended claims, the invention may be practiced otherwise than as specifically described herein. In particular, the architecture of the walk-through section of the present invention can be used advantageously with numerous types of ladders, as will be appreciated by persons of ordinary skill in the ladder art and is not limited to fixed and/or flared walk-through ladders.

What is claimed is:

1. In combination with (1) a ladder having a top end and comprised of a first plurality of rungs defining a first plane, said first plurality of rungs having a top rung having a first end and a second end at the top end of the ladder and (2) a walk-through section to be fixedly or movably secured at or proximate the top end of the ladder comprising:

(a) a second plurality of parallel handgrip rungs defining a second plane and having top and bottom handgrip rungs;

(b) a third plurality of parallel handgrip rungs defining a third plane and having top and bottom handgrip rungs; said second plane and said third plane being substantially in the same plane; and said bottom handgrip of said second plurality of parallel handgrip rungs being situated proximate the first end of the top rung of said first plurality of rungs at the top end of the ladder; said second plurality of parallel handgrip rungs attached at ends thereof to one side of said walk-through section and said bottom handgrip rung of said third plurality of parallel handgrip rungs being situated proximate the second end of the top rung of said first plurality of rungs at the top end of the ladder; said third plurality of parallel handgrip rungs attached at ends thereof to the other side of said walk-through section corresponding to said third plane, wherein said second plurality of parallel handgrip rungs and said third plurality of parallel handgrip rungs permit a climber of the ladder to maintain a continuum of hand grips during passage into or out of the walk-through section.

2. The ladder and walk-through section combination of claim 1, wherein the walk-through section is adapted to be permanently attached to a structure to be climbed.

3. The ladder and walk-through section combination of claim 1, wherein the walk-through section is adapted to be movably attached to a structure to be climbed.

4. The ladder and walk-through section combination of claim 1, wherein the walk-through section is adapted to be permanently attached to a railcar to be climbed.

5. The ladder and walk-through section combination of claim 1, wherein the walk-through section is adapted to be movably attached to a railcar to be climbed.

6. The ladder and walk-through section combination of claim 1, wherein the walk-through section is adapted to be permanently attached to a ship to be climbed.

7. The ladder and walk-through section combination of claim 1, wherein the walk-through section is adapted to be movably attached to a ship to be climbed.

8. The ladder and walk-through section combination of claim 1, wherein the walk-through section is adapted to be permanently attached to a tank truck to be climbed.

9. The ladder and walk-through section combination of claim 1, wherein the walk-through section is adapted to be movably attached to a tank truck to be climbed.

10. The ladder and walk-through section combination of claim 1, wherein the walk-through section is adapted to be permanently attached to a bunk bed to be climbed.

11. The ladder and walk-through section combination of claim 1, wherein the walk-through section is adapted to be movably attached to a bunk bed to be climbed.

12. The ladder and walk-through section combination of claim 1, wherein the walk-through section is adapted to be permanently attached to a hatch to be climbed.

13. The ladder and walk-through section combination of claim 1, wherein the walk-through section is adapted to be movably attached to a hatch to be climbed.

14. The ladder and walk-through section combination of claim 1, wherein the walk-through section is adapted to be movably attached to a manhole to be climbed.

15. In combination with (1) a ladder having a top end and comprised of a first plurality of rungs defining a first plane, said first plurality of rungs having a top rung having a first end and a second end at the top end of the ladder and (2) a walk-through section to be fixedly or movably secured at or proximate the top end of the ladder comprising:

(a) a second plurality of parallel handgrip rungs defining a second plane and having top and bottom handgrip rungs;

(b) a third plurality of parallel handgrip rungs defining a third plane and having top and bottom handgrip rungs; the first plane, said second plane and said third plane being substantially in the same plane; and said bottom handgrip of said second plurality of parallel handgrip rungs being situated proximate the first end of the top rung of said first plurality of rungs at the top end of the ladder; said second plurality of parallel handgrip rungs attached at ends thereof to one side of said walk-through section and said bottom handgrip rung of said third plurality of parallel handgrip rungs being situated proximite the second end of the top rung of said first plurality of rungs at the top end of the ladder; said third plurality of parallel handgrip rungs attached at ends thereof to the other side of said walk-through section corresponding to said third plane, wherein said second plurality of parallel handgrip rungs and said third plurality of parallel handgrip rungs permit a climber of the ladder to maintain a continuum of hand grips during passage into or out of the walk-through section.

16. In combination with (1) a ladder having a top end and comprised of first plurality of rungs defining a first plane, said first plurality of rungs having a top rung having a first end and a second end at the top end of the ladder and (2) a walk-through section to be fixedly or movably secured at or proximate the top end of the ladder comprising:

(a) a second plurality of parallel handgrip rungs defining a second plane and having top and bottom handgrip rungs;

(b) a third plurality of parallel handgrip rungs defining a third plane and having top and bottom handgrip rungs; sail second plane and said third plane being substantially in the same plane; and said bottom handgrip of said second plurality of parallel handgrip rungs being situated proximate the first end of the top rung of said first plurality of rungs at the top end of the ladder; said second plurality of parallel handgrip rungs attached at ends thereof to one side of said walk-through section and said bottom handgrip rung of said third plurality of parallel handgrip rungs being situated proximate the second end of the top rung of said first plurality of rungs at the top end of the ladder; said third plurality of parallel handgrip rungs attached at ends thereof to the other side of said walk-through section corresponding to said third plane, wherein the ladder is oriented at an angle relative to said second plurality of parallel handgrip rungs and said third plurality of parallel handgrip rungs, wherein said second plurality of parallel handgrip rungs and said third plurality of parallel handgrip rungs permit a climber of the ladder to maintain a continuum of hand grips during passage into or out of the walk-through section.

* * * * *